(12) United States Patent
Lopez Zuleta et al.

(10) Patent No.: US 11,523,217 B2
(45) Date of Patent: Dec. 6, 2022

(54) AUDIO SYSTEM FOR HEADREST WITH INTEGRATED MICROPHONE(S), RELATED HEADREST AND VEHICLE

(71) Applicant: Faurecia Clarion Electronics Europe, Paris (FR)

(72) Inventors: Nicolas Lopez Zuleta, Paris (FR); Mounira Rigaud-Maazaoui, Paris (FR); Jérôme Noirot, Paris (FR); Xenofon Doukopoulos, Paris (FR); Gaël Laqueille, Paris (FR); Jérémie Leclere, Paris (FR)

(73) Assignee: Faurecia Clarion Electronics Europe, Paris (FR)

( * ) Notice: Subject to any disclaimer, the term of this patent is extended or adjusted under 35 U.S.C. 154(b) by 0 days.

(21) Appl. No.: 16/912,036

(22) Filed: Jun. 25, 2020

(65) Prior Publication Data
US 2020/0413194 A1   Dec. 31, 2020

(30) Foreign Application Priority Data
Jun. 26, 2019 (FR) ..................... 19 06982

(51) Int. Cl.
*H04R 5/02* (2006.01)
*B60N 2/879* (2018.01)
(Continued)

(52) U.S. Cl.
CPC ............ *H04R 5/023* (2013.01); *B60N 2/806* (2018.02); *B60N 2/879* (2018.02); *B60N 2/885* (2018.02); *G10K 11/16* (2013.01); *H04R 2499/13* (2013.01)

(58) Field of Classification Search
CPC ... G10K 2210/1282; G10K 2210/3221; G10K 11/17825; G10K 2210/128;
(Continued)

(56) References Cited

U.S. PATENT DOCUMENTS 7,020,288 B1 *   3/2006   Ohashi ............ G10K 11/17823
                                                    381/71.4
9,767,826 B2      9/2017   Matheja et al.
(Continued)

FOREIGN PATENT DOCUMENTS

EP   2987341 B1   8/2016
EP   3094114 B1   11/2016
(Continued)

OTHER PUBLICATIONS

Felix Albu, "The Gauss-Seidel pseudo affine projection algorithm and its application for echo cancellation" (Year: 2003).*
(Continued)

*Primary Examiner* — Norman Yu
(74) *Attorney, Agent, or Firm* — Reising Ethington P.C.

(57) ABSTRACT

An audio system for a seat headrest includes N speaker(s), each configured to be integrated into a seat headrest, N being an integer greater than or equal to 1, and an audio processing device including an electronic transmission channel connected to the speaker(s) and configured to transmit at least one audio stream via the speaker(s). The audio system comprises P microphone(s), each configured to be integrated into the headrest, P being an integer greater than or equal to 1. The audio processing device further includes an electronic receiving channel connected to the microphone(s) and configured to receive at least one sound signal via the P microphone(s).

18 Claims, 2 Drawing Sheets

(51) Int. Cl.
*B60N 2/806* (2018.01)
*B60N 2/885* (2018.01)
*G10K 11/16* (2006.01)

(58) Field of Classification Search
CPC ..... G10K 11/17879; G10K 2210/1283; G10K 2210/12; G10K 2210/3023; B60N 2/879; B60N 2/80; B60N 2/885; B60R 2011/0017; B60R 11/0217; B60R 11/0247; B60R 2011/0015; H04R 2499/13; H04R 5/023; H04R 1/1083; H04R 1/02; H04R 2201/021; G10L 21/0208
USPC ............... 381/71.4, 86, 302, 71.7; 701/36
See application file for complete search history.

(56) References Cited

U.S. PATENT DOCUMENTS

| | | | | |
|---|---|---|---|---|
| 9,832,569 | B1* | 11/2017 | Ayrapetian | H04R 3/002 |
| 10,049,686 | B1* | 8/2018 | Hera | G10L 21/0364 |
| 2004/0174991 | A1* | 9/2004 | Hirai | H04R 3/02 |
| | | | | 379/406.08 |
| 2007/0218959 | A1* | 9/2007 | Kim | H04M 9/082 |
| | | | | 455/569.2 |
| 2010/0041443 | A1* | 2/2010 | Yokota | H04M 9/082 |
| | | | | 455/569.2 |
| 2012/0228023 | A1 | 9/2012 | Fukasaku et al. | |
| 2014/0211954 | A1* | 7/2014 | Hetherington | H04R 3/02 |
| | | | | 381/57 |
| 2014/0355793 | A1 | 12/2014 | Dublin et al. | |
| 2015/0256933 | A1 | 9/2015 | Vautin et al. | |
| 2016/0100250 | A1 | 4/2016 | Baskin et al. | |
| 2017/0186417 | A1* | 6/2017 | Maeda | G10K 11/17857 |

FOREIGN PATENT DOCUMENTS

| | | |
|---|---|---|
| EP | 3114826 B1 | 1/2017 |
| FR | 2945696 B1 | 2/2012 |

OTHER PUBLICATIONS

Felix Albu, Pseudo-Affine Projection Algorithm for Multichannel Active Noise Control (Year: 2007).*
Felix Albu, "Variable Step Size Dichotomous Coordinate Descent Affine Projection Algorithm" (Year: 2009).*
French Search Report corresponding to French application No. FR 1906982, dated Feb. 3, 2020, 2 pages.
H. Buchner et al., "A General Derivation of Wave-Domain Adaptive Filtering and Application to Acoustic Echo Cancellation", Signals, Systems and Computers, dated Oct. 26, 2008, pp. 816-823.

* cited by examiner

AUDIO SYSTEM FOR HEADREST WITH INTEGRATED MICROPHONE(S), RELATED HEADREST AND VEHICLE

CROSS-REFERENCE TO RELATED APPLICATIONS

This application is a U.S. non-provisional application claiming the benefit of French Application No. 19 06982, filed on Jun. 26, 2019, which is incorporated herein by reference in its entirety.

FIELD

The present invention relates to an audio system for a seat headrest, the audio system comprising N speaker(s), each configured to be integrated into a seat headrest, N being an integer greater than or equal to 1, and an audio processing device including an electronic transmission channel connected to the speaker(s) and configured to transmit at least one audio stream via the speaker(s).

The present invention also relates to such an audio processing device.

The present invention also relates to a seat headrest designed to be coupled to a backrest of a seat, the headrest being equipped with such an audio system, the speaker(s) and the microphone(s) being integrated into the headrest.

The invention also relates to a passenger transport vehicle, in particular a motor vehicle, comprising one or several seats, at least one seat being equipped with such a headrest.

The invention relates to the field of audio systems for passenger transport vehicles, in particular for motor vehicles.

BACKGROUND

Documents EP 2,987,341 B1 and EP 3,094,114 B1 teach an audio system of the aforementioned type. However, this audio system is limited to music applications and the interaction of the user with such an audio system is not always optimal.

SUMMARY

An aim of the invention is therefore to provide an audio system for a seat headrest making it possible to improve the interaction with the user who is seated in the seat equipped with said headrest, as well as the interaction with a remote terminal used by an interlocutor who is communicating with the user via telephone communication means, then offering the user and the interlocutor a better audio experience.

To that end, the invention relates to an audio system for a seat headrest, the audio system comprising N speaker(s), each configured to be integrated into a seat headrest, N being an integer greater than or equal to 1, and an audio processing device including an electronic transmission channel connected to the speaker(s) and configured to transmit at least one audio stream via the speaker(s), the audio system comprising P microphone(s), each configured to be integrated into the headrest, P being an integer greater than or equal to 1, and said audio processing device including an electronic receiving channel connected to the microphone(s) and configured to receive at least one sound signal via the P microphone(s).

With the audio system according to at least some embodiments of the invention, the interaction with the user is much better due to the microphone(s) configured to be integrated into the headrest, in particular offering him the possibility of telephone conversation in hands-free mode, and the electronic receiving channel connected to the microphones and configured to receive at least one sound signal via the P microphones.

The audio experience offered to the user is then significantly improved, in particular when he wishes to have a telephone conversation via the audio system, in hands-free mode, or to transmit a voice instruction via the audio system to a voice recognition system.

As an optional addition, when the electronic receiving channel further includes at least one echo cancellation module related to the microphone(s), this makes it possible to decrease the echo due to the speaker(s) integrated into the headrest, as well as any other speaker(s) inside the passenger compartment of a passenger transport vehicle including said audio system.

According to other advantageous aspects of the invention, the audio system comprises one or more of the following features, considered alone or according to all technically possible combinations:

- N and P are each greater than or equal to 2;
- the audio system comprises two channels, each channel including at least one speaker and at least one microphone, such as a right channel and respectively a left channel that are configured to be integrated into the headrest on the right and respectively on the left of a bearing zone for the head of a user;
- the electronic receiving channel includes at least one echo cancellation module related to the microphone(s) and configured to decrease the echo due to the speaker(s), preferably one echo cancellation module for each microphone, each echo cancellation module then being connected to a respective microphone,
- the number of echo cancellation module(s) then preferably also being equal to the product of M and P, where M represents the number of audio streams able to be emitted simultaneously via the speaker(s);
- the or each echo cancellation module is configured to further decrease the echo due to the one or several additional speaker(s), each additional speaker being configured to be installed at a distance from the seat headrest and inside a vehicle including said seat headrest;
- the electronic receiving channel includes a module for reducing the noise related to the microphone(s) and configured to reduce the noise in the signal received via the microphone(s);
- P is greater than or equal to 2, the electronic receiving channel includes a selection module configured to select the best signal among the signals received from the P microphones,
- the selection module preferably being configured to select the best signal as a function of a signal-to-noise ratio for each of the signals received from the microphones; and
- the electronic receiving channel includes an automatic gain control module connected to the microphone(s) and configured to adjust the gain of a signal resulting from the signal(s) received via the microphone(s).

The invention also relates to an audio processing device for an audio system as defined above, said audio processing device comprising:

- an electronic transmission channel connected to the speaker(s) and configured to transmit at least one audio stream via the speaker(s), and an electronic receiving channel connected to the microphone(s) and configured to receive at least one sound signal via the P microphone(s), said electronic receiving channel comprising at least one echo cancellation module connected to the microphone(s) and configured to decrease the echo due to the speaker(s), the number of echo cancellation module(s) being equal to the product of M and P, where M represents the number of audio streams able to be emitted via the speaker(s).

The invention also relates to a seat headrest designed to be coupled to a backrest of a seat, the headrest being equipped with an audio system as defined above, the speaker(s) and the microphone(s) being integrated into the headrest.

According to other advantageous aspects of the invention, the seat headrest comprises one or more of the following features, considered alone or according to any technical possible combinations:

the headrest comprises a central body and at least one side flap movable relative to the central body, at least one speaker and at least one microphone being integrated into a respective side flap, and the headrest comprises the central body and two side flaps arranged on either side of the central body, each side flap being movable relative to the central body, at least one speaker and at least one microphone preferably further being integrated into each side flap.

The invention also relates to a passenger transport vehicle, in particular a motor vehicle, the transport vehicle comprising one or several seats, at least one seat including a headrest as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
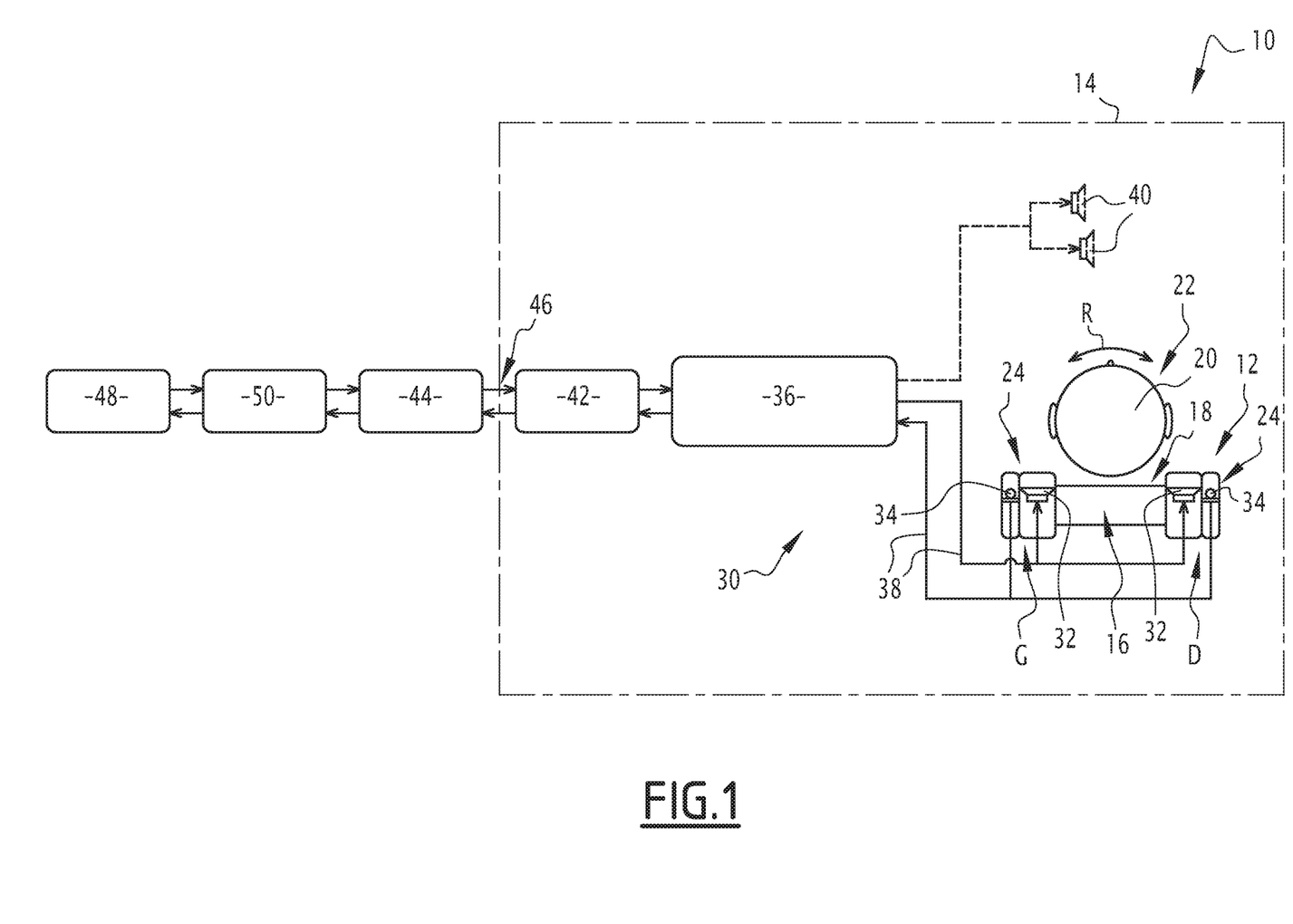
FIG. 1 is a schematic view of a passenger transport vehicle comprising at least one seat with a headrest equipped with an audio system according to an embodiment of the invention, the audio system for a seat headrest comprising one or several speaker(s) integrated into the seat headrest, an electronic channel for transmitting an audio stream via said speaker(s), as well as one or several microphone(s) integrated into the headrest and a receiving channel for at least one sound signal via said microphone(s)

In FIG. 1, a passenger transport vehicle 10 comprises one or several seats, not shown, at least one seat including a headrest 12. The transport vehicle 10 preferably includes several seats, distributed in one or several rows.

The transport vehicle 10 is for example a motor vehicle typically comprising several seats, preferably distributed in one, two or three rows of seats. When the transport vehicle 10 includes several rows of seats, the row of seats located in the front of the vehicle 10 in the movement direction of said vehicle is called front row, that located in the back of the vehicle 10 is called back row, and any rows of seats located between the front row and the back row are called intermediate rows.

The transport vehicle 10 comprises a passenger compartment 14 in which the seat(s) are arranged, the passenger compartment 14 being shown schematically by the rectangle in broken lines in FIG. 1.

Each headrest 12 is intended to be mechanically coupled to a backrest, not shown, of the respective seat. Each headrest 12 comprises a central body 16, typically forming a bearing zone 18 for the head 20 of a user 22.

As an optional addition, at least one headrest 12 comprises at least one side flap 24, arranged laterally relative to the central body 16, that is to say, arranged on one side of the central body 16 relative to an extension direction of the backrest of the seat to which said headrest is coupled.

In the example of FIG. 1, the headrest 12 comprises two side flaps 24 arranged on either side of the central body 16, namely a right side flap and a left side flap, the right and the left being defined relative to the movement direction of said vehicle. Each side flap 24 is preferably movable relative to the central body 16, and is for example rotatable relative to an axis substantially parallel to the extension axis of the backrest of the seat. The extension axis of the backrest of the seat generally extends substantially vertically. Each side flap 24 is for example articulated relative to the central body 16.

In a variant, the two side flaps 24 are stationary relative to the central body 16 of the headrest 12. The two side flaps 24 form a concave space with the central body 16 of the headrest 12.

At least one headrest 12 is equipped with an audio system 30 for a seat headrest, the audio system 30 comprising one or several speaker(s) 32, as well as one or several microphone(s) 34. The speaker(s) 32 and the microphone(s) 34 are then integrated into the headrest 12, that is to say, are received in a housing of the headrest 12, provided to that end.

When, as an optional addition, the headrest 12 comprises at least one side flap 24, at least one speaker 32 and at least one microphone 34 are preferably integrated into a respective side flap 24.

When, as another optional addition, the headrest 12 comprises two side flaps 24 arranged on either side of the central body 16 and the audio system 30 comprises at least two speaker(s) 32 and at least two microphones 34, at least one speaker 32 and at least one microphone 34 are preferably integrated into each respective side flap 24.

Figure 2:
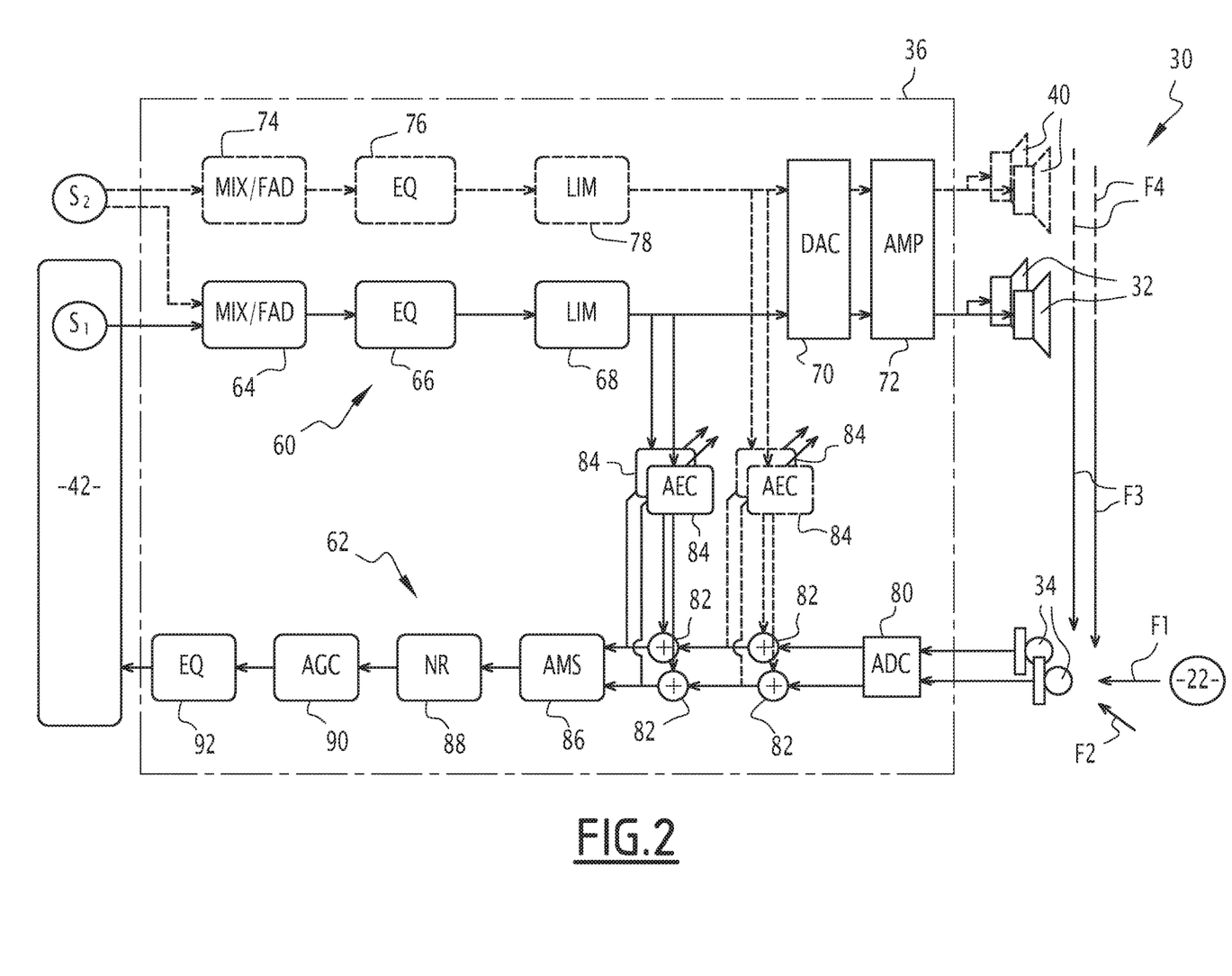
FIG. 2 is a schematic view of the audio system of FIG. 1.

In the example of FIGS. 1 and 2, the audio system 30 comprises N speaker(s) 32, each configured to be integrated into a respective seat headrest 12, N being an integer greater than or equal to 1, P microphone(s) 34, each being configured to be integrated into the headrest 12, P being an integer greater than or equal to 1, and an audio processing device 36 connected to the N speaker(s) 32 and to the P microphone(s) 34 via respective connections 38, preferably wired.

As an optional addition, the audio system 30 comprises one or several additional speaker(s) 40, configured to be arranged inside the passenger compartment 14 of the vehicle 10 and at a distance from the speaker 12. According to this optional addition, the speaker(s) 32 are then also called headrest speakers, and the additional speaker(s) 40 are then also called passenger compartment speakers.

In the example of FIG. 1, the audio system 30 is illustrated in a hands-free mobile telephone application, and the processing device 36 of the audio system 30 is for example connected to a radio communication module 42, such as a short-range radio communication module, for example a radio communication module according to the Bluetooth standard. The radio communication module 42 is then connected to a user terminal 44 via a radio link 46, such as a link according to the Bluetooth standard, or via a wired connection, such as a cable. The radio communication module 42 is typically arranged inside the passenger compartment 14. The user terminal 44 is for example a mobile telephone of the user 22, and is able to communicate with a remote electronic equipment item 48, such as a remote terminal, via a communication network 50. The remote electronic equipment item 48 is for example a mobile telephone of an interlocutor communicating with the user 22.

In the example of FIG. 2, the number N of speakers 32 and the number P of microphones 34 are each greater than or equal to 2. The number P is preferably equal to 2, with a microphone 34 for each side flap 24. The number N is for example equal to 2, with a speaker 32 for each side flap 24; or to 4, with two speakers 32 for each side flap 24; or to 3, with a speaker 32 for each side flap 24, as well as a speaker 32 for the central body 16 of the headrest 12.

In the example of FIG. 1, the audio system 30 in particular comprises two channels, such as a right channel D and respectively a left channel G that are configured to be integrated into the headrest 12 on the right and left sides of a bearing zone 18 for the head 20 of the user 22, as shown in FIG. 1. Each channel D, G includes at least one speaker 32 and at least one microphone 34.

Each speaker 32 is preferably arranged in the upper part of the headrest 12 and near an estimated position of a corresponding ear, or both ears, of the user 22. Each speaker 32 is oriented toward the estimated position of the corresponding ear.

Each speaker 32 is preferably moved as far away as possible from the corresponding microphone 34, while having the speaker 32 and the microphone 34 arranged within the headrest 12.

Each microphone 34 is preferably positioned at one end of the headrest 12, in the lower part of the headrest 12, also preferably at one end of a respective flap 24, while being oriented toward an estimated position of the mouth of the user 22.

As an example, each microphone 34 is oriented along a direction perpendicular to a transmission direction of the closest speaker 32. The transmission direction of the speaker 32 refers to the main direction along which the sound will be transmitted by the speaker 32, this direction for example corresponding to the movement direction of a magnet associated with a membrane of the speaker 32.

This direction of the microphone 34 perpendicular to the transmission direction of the corresponding speaker 32 makes it possible to decrease the influence of the acoustic echo coming from this speaker 32 and to then increase the signal-to-echo ratio.

In a variant, each microphone 34 is oriented along a direction substantially parallel to a transmission direction of the closest speaker 32.

The orientation of the microphone 34 toward the estimated position of the mouth of the user 22 makes it possible to increase the intensity of the captured signal, in particular that due to the speech of the user 22 (arrow F1 in FIG. 2), in particular in the treble range.

As an optional addition, the receiving housing of the speaker 32 is insulated from the receiving housing of the corresponding microphone 34, in order to limit a mechanical (in light of a structure-borne transmission of the sound) and acoustic (in light of an aerial transmission of the sound) coupling between said speaker 32 and said microphone 34. For example, separate and sealed cavities (in light of an aerial transmission of the sound) with respect to one another are provided for said speaker 32 and said microphone 34.

Also as an optional addition, and in order to further reduce the mechanical coupling between the speaker 32 and the microphone 34, the speaker 32 and the microphone 34 are each integrated into a respective flap 24, the flap 24 including the speaker 32 then being separate from the flap 24 including the microphone 34.

As another optional addition, the headrest 12, and preferably the flap(s) 24, include one or several acoustic materials arranged between the receiving housing of the speaker 32, on the one hand, and the receiving housing of the microphone 34, on the other hand. This or these acoustic materials make it possible to minimize the transmission of vibrations between the speaker 32 and the microphone 34 in a bandwidth corresponding to the voice, in particular for mobile telephone and voice recognition applications, for example in the bandwidth between 50 Hz and 8 kHz. The acoustic material is for example an elastomer.

The audio processing device 36 comprises an electronic transmission channel 60 connected to the speaker(s) 32, 40 and configured to transmit at least one audio stream via the speaker(s) 32, 40, as shown in FIG. 2.

The audio processing device 36 also comprises an electronic receiving channel 62 connected to the microphone(s) 34 and configured to receive at least one sound signal via the microphone(s) 34.

The audio processing device 36 is for example in the form of an electronic board including only the electronic transmission 60 and receiving 62 channels. In a variant, the audio processing device 36 is integrated into an electronic board including both the electronic transmission 60 and receiving 62 channels, and other functionalities, for example the radio communication module 42.

The transmission channel 60 is suitable for being connected to a first source $S_1$, such as the remote electronic equipment item 48 in communication with the user terminal 44, the user terminal 44 then forming a communication gateway between the remote electronic equipment item 48 and the audio processing device 36, or a voice recognition module, not shown, as well as, by way of optional addition, to a second source $S_2$, such as a music reader device, typically a car radio, or a navigation device, or a sound animation device inside the vehicle 10.

The transmission channel 60 comprises, from the source(s) $S_1$, $S_2$ toward the speaker(s) 32, a first mixer and fader module 64, also denoted MIX/FAD, connected to the first source $S_1$, a first equalizer module 66, also denoted EQ, connected to the output of the first mixer and fader module 64, a first limiter module 68, connected to the output of the first equalizer module 66, the first limiter module 68 also being denoted LIM.

In addition, the transmission channel 60 comprises a digital to analog converter 70, also denoted DAC, connected to the output of the first limiter module 68, and an amplifier 72, also denoted AMP, connected to the output of the digital to analog converter 70. The amplifier 72 is connected to the input of the speaker(s) 32, as well as, by way of optional addition, that of the additional speaker(s) 40.

When, by way of optional addition, the audio system 30 comprises one or several additional speaker(s) 40, the transmission channel 60 comprises a second mixer and fader module 74, also denoted MIX/FAD, connected to the second source $S_2$, a second equalizer module 76, also denoted EQ, connected to the output of the second mixer and fader module 74, a second limiter module 78, also denoted LIM, connected to the output of the second equalizer module 76. According to this optional addition, the second limiter module 78 is connected to the input of the digital to analog converter 70.

In a variant that is not shown, the transmission channel 60 comprises, in place of the digital to analog converter 70, two separate digital to analog converters, namely a first digital to analog converter connected to the output of the first limiter module 68 and a second digital to analog converter connected to the output of the second limiter module 78.

In a variant that is not shown, the transmission channel 60 comprises, in place of the amplifier 72, two separate amplifiers, namely a first amplifier connected to the output of the digital to analog converter 70, or according to the aforementioned variant, to the output of the first digital to analog converter, and a second amplifier connected to the output of the digital to analog converter 70, or according to the aforementioned variant, to the output of the second digital to analog converter.

In a variant that is not shown, the transmission channel 60 comprises the same mixer and fader modules 64, 74, the same equalizer modules 66, 76 and the same limiter modules 68, 78, but arranged in a different order from the source(s) $S_1$, $S_2$ toward the speaker(s) 32, 40. As an example, in a variant, the first equalizer module 66 is connected to the first source $S_1$, then the first mixer and fader module 64 is connected to the output of the first equalizer module 66, and the first limiter module 68 is connected to the output of the first mixer and fader module 64, the first limiter module 68 in turn being connected to the input of the digital to analog converter 70. According to this variant, the second equalizer module 76 is similarly connected to the second source $S_2$, the second mixer and fader module 74 is connected to the output of the second equalizer module 76 and the second limiter module 78 is connected to the output of the second mixer and fader module 74, the second limiter module 78 being connected to the input of the digital to analog converter 70.

When the second source $S_2$ is present, one skilled in the art understands that the first mixer and fader module 64 is preferably connected both to the first source $S_1$ and to the second source $S_2$, so as to be able to broadcast, over the headrest speaker(s) 32, audio streams coming from both the first source $S_1$ and the second source $S_2$.

When the first source $S_1$ is the remote electronic equipment item 48 or the voice recognition module, the audio processing device 36 is typically connected to the radio communication module 42, like in the example of FIG. 1. When the second source $S_2$ is the music reading device, or the navigation device or the sound animation device, one skilled in the art will of course understand that the audio processing device 36 is then connected to the music reading device, the navigation device or the sound animation device, respectively.

One skilled in the art will further understand that each source $S_1$, $S_2$ is able to transmit one or several audio streams.

The receiving channel 62 comprises, from the microphone(s) 34 toward the module or device connected to the audio processing device 36 at the output of the receiving channel 62, for example the radio communication module 42, an analog to digital converter 80, also denoted ADC, the analog-to-digital converter 80 being connected to each microphone 34; one or several adders 82, each being able to add, on the one hand, a signal coming from the analog-to-digital converter 80 or from a preceding adder 82 of the receiving channel 62, and on the other hand, a signal coming from an acoustic echo cancellation module 84, also denoted AEC.

The receiving channel 62 comprises at least one echo cancellation module 84 for each microphone 34, and also preferably an echo cancellation module 84 for each microphone 34 and for each audio stream able to be transmitted simultaneously via the speaker(s) 32, 40. The number of echo cancellation modules 84 contained in the receiving channel 62 is then preferably equal to M×P, where M represents the number of audio streams able to be transmitted simultaneously via the speaker(s) 32, 40, and P represents the number of microphone(s) 34, as previously described. In the example of FIG. 2, the number M of audio streams able to be transmitted simultaneously via the speakers 32, 40 is equal to two, namely a right audio stream and a left audio stream, so as to have a stereophony, and the number P of microphone(s) 34 is equal to two, such that the number of echo cancellation modules 84 is equal to four in this example.

One skilled in the art will further understand that if a same audio stream is broadcast over two separate speakers 32, 40, then this audio stream counts as a single audio stream, including if this audio stream is broadcast with a delay between the two speakers 32, 40, or if a linear filtering is applied to this stream before it is broadcast over one of the two speakers 32, 40.

The receiving channel 62 also comprises a selection module 86, also denoted AMS (Automatic Microphone Selection), connected to the output of the adder(s) 82, the selection module 86 being connected to the output of the last adder(s) 82 of the receiving channel 62 if there are multiple adders 82 successively connected one after the other.

The receiving channel 62 also comprises a noise reduction module 88, also denoted NR, connected to the output of the selection module 86, an automatic gain control module 90, also denoted AGC, connected to the output of the noise reduction module 88, and a third equalizer module 92, also denoted EQ, connected to the output of the automatic gain control module 90, the third equalizer module 92 then being connected to the input of the module or device that is connected to the audio processing device 36 at the output of the receiving channel 62, such as the radio communication module 42.

In a variant that is not shown, the receiving channel 62 comprises the same adders 82, echo cancellation module 84, selection module 86, noise reduction module 88, automatic gain control module 90 and third equalizer module 92, but arranged in a different order from the microphone(s) 34 toward the module or device connected to the audio processing device 36 at the output of the receiving channel 62. As an example, the noise reduction module 88 is connected at the output of the adder(s) 82, the receiving channel 62 then preferably including a noise reduction module 88 for each microphone 34, then the selection module 86 is connected to the output of each noise reduction module 88, the automatic gain control module 90 being connected to the output of the selection module 86, and lastly the third equalizer module 92 being connected to the output of the automatic gain control module 90.

The first mixer and fader module 64 is configured to mix the signals coming from several audio sources, in case of multiple audio sources at the input of the audio processing device 36, and/or to fade the sound level of the different sources as a function of a gain associated with each of the sources.

The first mixer and fader module 74 is for example configured to obtain a weighted sum of the different input sources, as a function of a predefined fade gain for each source. The first mixer and fader module 74 for example includes a fader connected to these different sources and suitable for weighting each source as a function of the respective predefined fade gain, followed by a mixer suitable for mixing the different signals coming from the mixer, and typically for adding the different signals coming from the mixer.

The first mixer and fader 64 is then typically configured to mix telephone voice messages coming from the remote electronic equipment item 48 or voice recognition messages with other audio sources, such as music, navigation or ring tone sources.

The first mixer and fader module 64 is also configured to attenuate or cut the sound of each source in the case where one or several other sources should be broadcast over the speaker(s) 32. In addition, the first mixer and fader module 64 makes it possible, in telephony and voice recognition, to obtain the entire audio stream for the reference signal that will be supplied at the input of the echo cancellation module(s) 84, and thus to cancel out any other audio stream that would be broadcast at the same time over the speaker(s) 32.

The first equalizer module 66 is known in itself and makes it possible to apply a frequency filter to the signal received at the input in order to obtain, at the output, a modified signal with different levels depending on the considered frequencies.

The first equalizer module 66 in particular makes it possible to improve the frequency response of the speaker(s) 32 integrated into the headrest 12 by for example using one or several reference filters making it possible to correct the timbre of the voice played over the speakers and to give it more warmth, clarity and precision. Indeed, the integration of the speaker(s) 32 into the headrest 12 modifies the frequency response of each speaker 32. As an example, the frequency response of each speaker 32 must preferably have a shape that is not flat and/or can be very limited in terms of low frequencies due to the smaller dimensions of each speaker 32.

The first equalizer module 66 is for example configured to apply one or several successive biquad filters for each of the audio streams able to be broadcast simultaneously over the speaker(s) 32, for example for the left and right audio streams. A biquad filter is known in itself and is a second-order recursive linear filter, containing two poles and two zeros. The transfer function of such a biquad filter is a ratio between two quadratic functions.

The first limiter module 68 is configured to limit the gain of the audio stream(s), so as to avoid clipping distortions, in particular after equalizing and mixing.

The digital to analog converter 70 and the amplifier 72 are known in themselves.

The second mixer and fader module 74 is similar to the first mixer and fader module 64, the second equalizer module 76 being similar to the first equalizer module 66, and lastly the second limiter module 78 being similar to the first limiter module 68.

Each adder 82 and each associated echo cancellation module 84 are connected to the microphone(s) 34, for example via the analog-to-digital converter 80, and configured to decrease the echo caused by the speaker(s) 32, 40, illustrated by the arrows F3 and F4 in FIG. 2, that is to say, the echo due to the headrest speaker(s) 32 and/or the passenger compartment speaker(s) 40.

In the example of FIG. 2, each adder 82 and each associated echo cancellation module 84 are configured to decrease the echo for a respective microphone 34 and for an audio stream able to be transmitted over a respective speaker 32, 40. Each adder 82 is then configured to add, on the one hand, the signal coming from the respective microphone 34 via the analog-to-digital converter 80, and on the other hand, the signal coming from the respective echo cancellation module 84, the signal coming from the respective echo cancellation module 84 being intended to decrease, or even cancel, the echo contained in the signal coming from the microphone 34 and corresponding to the speaker stream with which the echo cancellation module 84 is associated. The echo cancellation module 84 is for example connected to the output of the respective limiter module 68, 78 corresponding to the audio stream with which it is associated, and also to the output of the adder 82 with which it is associated, this connection to the output of the adder 82 forming a feedback loop.

The echo cancellation module 84 is for example configured to perform an echo cancellation via an adaptive filtering implementing an affine projection algorithm (APA), according to the following equations:

$$\begin{cases} e(n) = y(n) - h^T(n) \cdot x(n) & \text{[Math 1]} \\ h(n+1) = h(n) + \mu \cdot X(n) \cdot (X^T(n) \cdot X(n) + \Delta)^{-1} \cdot e(n) \end{cases}$$

where the term $X(n) \cdot (X^T(n) \cdot X(n) + \Delta)^{-1} \cdot e(n)$ is calculated by using a dichotomous coordinate descent (DCD)

y(n) represents the signal coming from the microphone 34, in the form of a size vector $N_{APA} * 1$ x(n) represents the signal broadcast over the speaker 32, 40, in the form of a size vector $L_{APA} * 1$ e(n) represents the signal coming from the echo cancellation module 84, in the form of a size vector $N_{APA} * 1$ h(n) represents an adaptive filter modeling the acoustic path between the speaker 32, 40 and the microphone 34, in the form of a size vector $L_{APA} * 1$ µ represents an adaptive pitch making it possible to modulate the update speed of the adaptive filter, X(n) is a matrix verifying:

$$X(n) = [x(n)x(n-1) \ldots x(n-N_{APA}+1)] \quad \text{[Math 2]}$$

$\Delta$ represents a regularization factor of the matrix X(n), making it possible to control its conditioning and therefore the stability of the update of the adaptive filter, n represents an integer iteration index, and $X^T$ is the matrix transpose of X.

The echo cancellation module(s) 84 associated with the adders 82 then make it possible to decrease, or even cancel, any signal coming from the speaker(s) 32, 40, so as to keep only the part corresponding to the voice of the user 22 within the signal captured by the microphone(s) 34, typically during a telephone call or during the transmission of a voice instruction.

When the number P of microphones 34 is greater than or equal to two, the selection module 86 is configured to select the best signal among the signals received from the P microphones 34. The selection module 86 is for example configured to select the best signal as a function of a signal-to-noise ratio SNR for each of the signals received from the microphones 34, for example in the manner described in document FR 2,945,696 B1, in particular on page 6, line 20 to page 12, line 30.

The selection module 86 then makes it possible to choose, from among the signals coming from the microphones 34, that which has the highest speech level. This selection module 86 is particularly useful when the user 22 turns his head 20 to the right or the left, that is to say, performs a rotational movement along the arrow R in FIG. 1. Indeed, such a movement of the head 20 of the user 22 causes an increase or respectively a decrease in the distance between the mouth of the user 22 and the respective microphone 34, which then causes a decrease or respectively an increase in the signal-to-noise ratio and the corresponding signal-to-echo ratio. In other words, the selection module 86 makes it possible to keep the best signal despite a rotation of the head of the user 22 along the arrow R, and makes it possible to limit the effects of a rotational movement of the head 20, upon capturing the voice of the user 22.

The noise reduction module 88 is connected to the microphone(s) 34, for example via the analog-to-digital converter 80, the adder(s) 82, and the selection module 86, and is configured to reduce the noise in the signal received via said microphone(s) 34.

During a telephone call or a voice recognition command with transmission of a voice instruction by the user 22, the microphone(s) 34 capture not only the voice of the user 22 along the arrow F1, but also an ambient noise along the arrow F2 in FIG. 2. The noise reduction module 88 then makes it possible to reduce the ambient noise in the signal captured by the microphone(s) 34 during this telephone call or this voice recognition, and then to improve the quality of the call or the voice recognition performance. This improvement to the audio quality is then perceptible according to different criteria, in particular better intelligibility of the call, less audio bother for example owing to reduced noise, or a more natural quality of the voice (timbre, warmth, clarity, precision).

The automatic gain control module 90 is connected to the microphone(s) 34, for example via the analog to digital converter 80, the adder(s) 82, the selection module 86 and the noise reduction module 88, and is configured to apply the gain to a signal resulting from the signal(s) received via the microphone(s) 34.

The value of the gain varies over time, depending on the level of the speech by the user 22. It is calculated such that the level of the speech leaving the automatic gain control module 90 is constant over time, irrespective of the voice of the user 22, irrespective of the position or orientation of his head 20 on the headrest 12.

This automatic gain control module 90 makes it possible to have, as output, a signal of substantially constant level, which makes it possible to further improve the quality of a telephone call or the voice recognition performance. This automatic gain control module 90 is in particular useful in case of movement of the head 20 of the user 22, for example in case of rotation along the arrow R in FIG. 1.

The third equalizer module 92 is configured to apply a frequency filter to the signal coming from the automatic gain control module 90, so as to improve the frequency response of the signal intended to be sent to the module or device leaving the audio processing device 36, such as the radio communication module 42. The third equalizer module 92 makes it possible to further improve the quality of the speech sent to the interlocutor of the user 22 in case of telephone call, or to improve the quality of the voice instruction sent to the voice recognition module.

As an optional addition, the receiving channel 62 further comprises a limiter module, not shown, connected to the output of the third equalizer module 92.

Thus, with the audio system 30, the interaction with the user 22 is indeed better due to the microphone(s) 34 configured to be integrated into the headrest 12 and the receiving channel 62 connected to the microphone(s) 34 and configured to receive at least one sound signal via the microphones 34. In particular, the quality of the voice or the quality of the voice instruction is then much better with the microphone(s) 34 integrated into the headrest 12, in particular when the user 22 wishes to have a telephone conversation or to transmit a voice command, or instruction, via the audio system 30.

As an optional addition, when the receiving channel 62 further includes the echo cancellation module(s) 84, the audio system 30 makes it possible to decrease, or even cancel, the echo caused by the headrest speaker(s) 32 (arrow F3 in FIG. 2) and/or the passenger compartment speaker(s) 40 (arrow F4 in FIG. 2), for example when the user 22 is listening to music at the same time that he is having a telephone conversation. Thus, with the audio system 30, the other passengers in the vehicle 10 can continue to listen to music while the user 22 makes a phone call. Additionally, the interlocutor who is having a telephone conversation with the user 22 will not hear, or hear very little of, the music broadcast inside the vehicle 10, due to the echo cancellation module(s) 84. Similarly, the echo cancellation module(s) 84 make it possible to significantly improve the voice recognition performance in the case where the user 22 transmits a voice instruction while music is broadcast at the same time over the speaker(s) 32, 40. Furthermore, since the interlocutor's voice reaches the user 22 via the speakers 32 of the headrest 12, rather than via the additional speakers 40, the user 22 will hear the remote interlocutor better and more clearly.

As another optional addition, the noise reduction module 88 makes it possible to reduce the noise (arrow F2 in FIG. 2) detected by the microphone(s) 34.

As another optional addition, the selection module 86 and/or the automatic gain control module 90 makes it possible to limit, or each completely offset, the impact of a movement of the head 20, such as a rotation along the arrow R, on the sound signal detected by the microphone(s) 34.

One can thus see that the audio system 30 makes it possible to improve the interaction with the user 22, as well as with the remote electronic equipment 48 used by the interlocutor, offering them a better audio experience.

The invention claimed is:

1. An audio system for a seat headrest, the audio system comprising:
    N speaker(s), each configured to be integrated into a seat headrest, N being an integer greater than or equal to 1; and
    an audio processing device including an electronic transmission channel connected to the speaker(s) and configured to transmit at least one audio stream via the speaker(s);
    wherein the audio system comprises P microphone(s), each configured to be integrated into the headrest, P being more than 2, the total number of microphones in the audio system being equal and fixed to P;
    wherein said audio processing device further includes an electronic receiving channel connected to the microphone(s) and configured to receive at least one sound signal via the P microphone(s);
    wherein the electronic receiving channel includes at least one echo cancellation module that is related to the microphone(s) and that is configured to decrease the echo due to the speaker(s); and
    wherein the number of echo cancellation module(s) is equal to the product of M and P, where M represents the number of audio streams able to be emitted simultaneously via the speaker(s), M being greater than or equal to two.

2. The audio system according to claim 1, wherein N and P are each greater than or equal to 2.

3. The audio system according to claim 1, wherein the audio system comprises two channels, each channel including at least one speaker and at least one microphone.

4. The audio system according to claim 3, wherein the two channels are a right channel and a left channel that are configured to be integrated into the headrest on respective right and left sides of a bearing zone for the head of a user.

5. The audio system according to claim 1, wherein the electronic receiving channel includes at least one echo cancellation module for each microphone, each echo cancellation module being connected to a respective microphone.

6. The audio system according to claim 1, wherein the number of echo cancellation module(s) is equal to the product of M and P, where M represents the number of audio streams able to be emitted simultaneously via the speaker(s).

7. The audio system according to claim 1, wherein the or each echo cancellation module is configured to further decrease the echo due to the one or several additional speaker(s), each additional speaker being configured to be installed away from the seat headrest and inside a vehicle including said seat headrest.

8. The audio system according to claim 1, wherein the electronic receiving channel includes a module for reducing the noise related to the microphone(s) and configured to reduce the noise in the signal received via the microphone(s).

9. The audio system according to claim 1, wherein the electronic receiving channel includes a selection module configured to select the best signal among the signals received from the P microphones.

10. The audio system according to claim 9, wherein the selection module is configured to select the best signal as a function of a signal-to-noise ratio for each of the signals received from the microphones.

11. The audio system according to claim 1, wherein the electronic receiving channel includes an automatic gain control module connected to the microphone(s) and configured to adjust the gain of a signal resulting from the signal(s) received via the microphone(s).

12. A seat headrest designed to be coupled to a backrest of a seat, wherein the headrest is equipped with the audio system according to claim 1, the speaker(s) and the microphone(s) being integrated into the headrest.

13. The headrest according to claim 12, wherein the headrest comprises a central body and at least one side flap movable relative to the central body, at least one speaker and at least one microphone being integrated into the at least one side flap.

14. The headrest according to claim 13, wherein the headrest comprises the central body and two side flaps arranged on either side of the central body, each side flap being movable relative to the central body.

15. The headrest according to claim 13, wherein at least one speaker and at least one microphone are integrated into each side flap.

16. A passenger transport vehicle comprising one or several seats, wherein at least one seat includes the headrest according to claim 12.

17. The transport vehicle according to claim 16, wherein the transport vehicle is a motor vehicle.

18. An audio system for a seat headrest, the audio system comprising:
an audio processing device including an electronic transmission channel connected to two or more speakers and configured to transmit two or more audio streams via the two or more speakers;
two or more microphones, each configured to be integrated into the headrest; and
an electronic receiving channel configured to receive at least one sound signal from the two or more microphones,
wherein the electronic receiving channel includes a plurality of echo cancellation modules that each generates an echo cancellation output signal, and wherein each echo cancellation output signal is generated for an audio stream-microphone pair comprising a respective audio stream of the plurality of audio streams and a respective microphone of the two or more microphones such that each of the echo cancellation modules are different from one another in that each echo cancellation module generates the echo cancellation output signal for a different audio stream-microphone pair.

* * * * *